United States Patent [19]

Petkoff

[11] 4,347,010
[45] Aug. 31, 1982

[54] CLEANING DEVICE FOR EYEGLASSES

[76] Inventor: Alex Petkoff, No. 131, Hochstädter Landstrasse, 645 Hanau/Hohe Tanne, Fed. Rep. of Germany

[21] Appl. No.: 66,139

[22] Filed: Aug. 13, 1979

[51] Int. Cl.³ .............................................. G02C 11/08
[52] U.S. Cl. ...................................... 401/10; 401/156
[58] Field of Search ...................................... 401/9–11, 401/195, 145, 152, 156, 162, 158

[56] References Cited

U.S. PATENT DOCUMENTS

| | | | |
|---|---|---|---|
| 609,978 | 8/1898 | Schulte | 401/162 |
| 2,055,314 | 9/1936 | Seburger | 401/10 |
| 2,228,580 | 1/1941 | Strum | 401/152 |
| 2,284,207 | 5/1942 | Hawkins | 401/145 |
| 2,458,015 | 1/1949 | McDonald | 401/10 |
| 2,607,513 | 8/1952 | Lawson | 401/158 |
| 2,775,778 | 1/1957 | Mattson | 401/10 |
| 2,908,923 | 10/1959 | Schlechter | 401/10 |
| 3,048,878 | 8/1962 | Gray et al. | 401/10 |
| 3,639,069 | 2/1972 | Gordon | 401/195 |

FOREIGN PATENT DOCUMENTS

| | | | |
|---|---|---|---|
| 452810 | 3/1968 | Switzerland | 401/10 |
| 13630 | of 1915 | United Kingdom | 401/156 |

Primary Examiner—William Pieprz
Attorney, Agent, or Firm—John C. Smith, Jr.

[57] ABSTRACT

A cleaning device for eyeglasses comprises an elongated casing having a circumferentially closed wall, open ends and removable upper and lower lids for closing said ends. A guide member conformed to the inner shape of the casing is longitudinally slidable in the casing and has a rearwardly extending projection. A conduit extends through the guide member and the projection. Two oppositely arranged resilient limbs extend forwardly from the guide member and have free ends carrying retainers for sponge-like wipers. Each of said limbs is adapted to grip in the extended position of the limbs around the edge of a spectacle lens. The sponge-like wipers are replaceably connected to the retainers. Conduits extend longitudinally through the limbs and communicate with the conduit in the guide member and in the rearwardly extending projection. A film bag is detachably attached to the rearwardly extending projection and filled with a liquid cleaning agent. Two diaphragms are provided in the wall of the casing and adapted to be pressed in the extended position of the limbs and wipers so as to cause the film bag to dropwise emit cleaning agent via the conduit in the guide member and in the projection, the conduits in the limbs and in the wipers to the spectacle lens.

8 Claims, 4 Drawing Figures

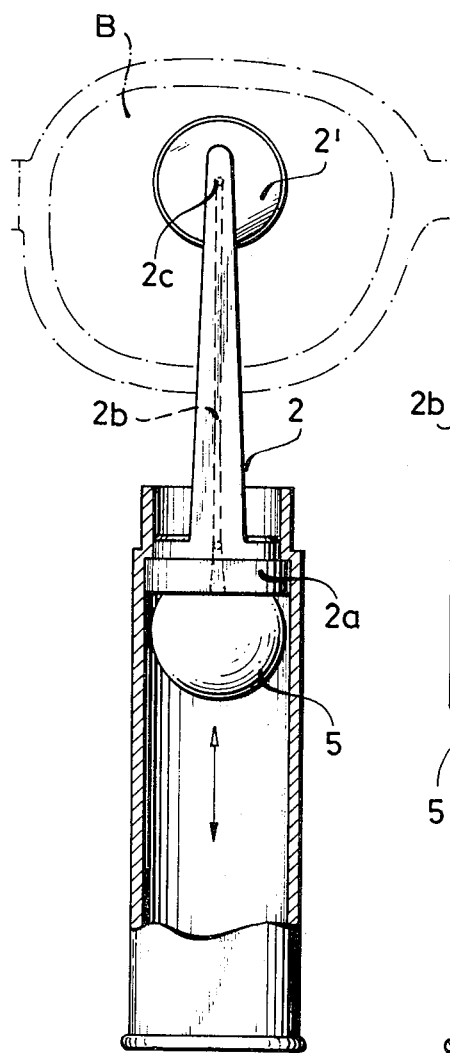
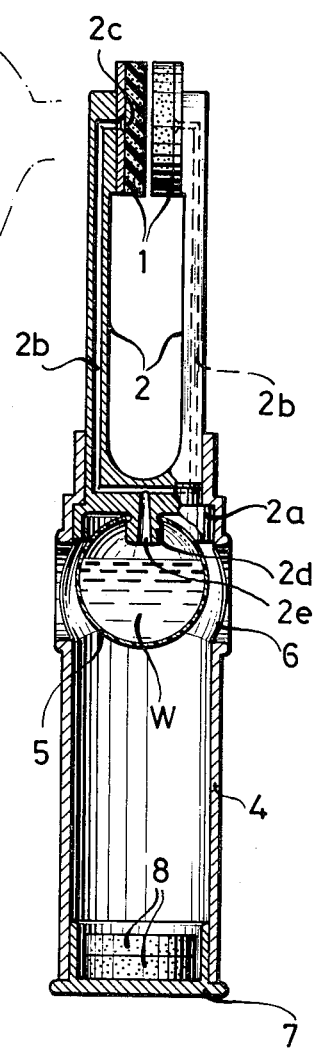
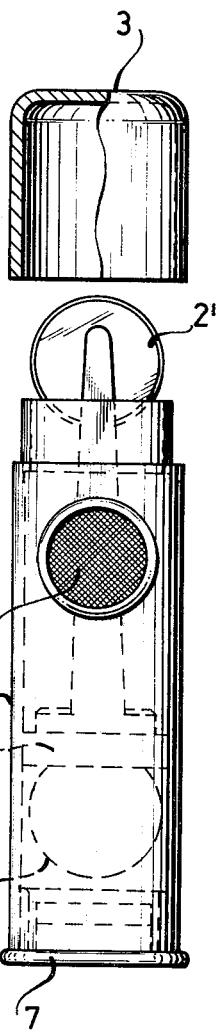
FIG. 1b FIG. 1a FIG. 1 FIG. 1c

CLEANING DEVICE FOR EYEGLASSES

BACKGROUND OF THE INVENTION

This invention relates to a novel cleaning device for eyeglasses, which is always able to be taken along and is usable at any time. Wearers of eyeglasses know the fact how often a day the glasses are dimmed so for instance by an unintended touching of the glasses or as a result of temperature differences. The contamination of the glasses is often so heavy that only a washing with water and a subsequent drying by rubbing helps.

SUMMARY OF THE INVENTION

It is, therefore, an object of the present invention to provide a cleaning device for eyeglasses by means of which a wearer of glasses is able to effect a thorough cleaning of the glasses in the office or at home at any time, said cleaning device being in the form of a small implement which can be carried in a pocket and has generally the size of a lighter.

To attain this object the present invention provides a cleaning device for eyeglasses which comprises an elongated casing having a circumferentially closed wall and open ends; removable upper and lower lids for closing said ends; a guide member conformed to the inner shape of the casing and longitudinally slidable therein, said guide member having a rearwardly extending projection; a conduit extending through the guide member and the projection; two oppositely arranged resilient limbs extending forwardly from the guide member and having free ends carrying retainers, each of said limbs being adapted to grip in the extended position of the limbs around the edge of a spectacle lens; sponge-like wipers replaceably connected to the retainers at the free ends of the resilient limbs; conduits extending longitudinally through the limbs and communicating with the conduit in the guide member and in the rearwardly extending projection; a film bag detachably attached to the rearwardly extending projection and filled with a liquid cleaning agent, and two diaphragms provided in the wall of the casing and adapted to be pressed in the extended position of the limbs and the wipers so as to cause the film bag to dropwise emit cleaning agent via the conduit in the guide member and in the projection, the conduits in the limbs and in the wipers to the spectacle lens.

BRIEF DESCRIPTION OF THE DRAWING

A preferred embodiment of the invention will now be described by way of example and with reference to the accompanying drawing, in which:

FIG. 1 is a front elevational view of a cleaining device for eyeglasses when not in use;

FIG. 1a is a sectional side view of the cleaning device with the wipers extended and the upper lid removed;

FIG. 1b is a front-elevational view, partly in section of the cleaning device in operation, and FIG. 1c is a top plan view of FIG. 1a.

DESCRIPTION OF THE PREFERRED EMBODIMENT

The drawing shows a pair of disc-shaped sponge-like wipers 1 which are detachably connected to the free ends of resilient limbs 2 which at their opposite ends are connected to a guide member 2a conformed to the inner shape of an elongated casing 4 in which is is slidably guided in the longitudinal direction thereof. The casing 4 may be of circular, oval, rectangular or substantially rectangular cross section. The guide member 2a at its bottom has a rearwardly extending projection 2d which defines a conduit and serves for detachably receiving a film bag 5 filled with a liquid cleaning agent W. The conduit 2e in the projection 2d extends also transversely in the guide member 2a and communicates with two further conduits 2b defined by the limbs 2 and merging at their forward ends into nozzles 2c located directly adjacent to the wipers 1 as shown in FIG. 1a.

FIG. 1a also shows two oppositely arranged diaphragms 6 which may be formed integral with the wall of the casing 4 by thinning the casing wall or may be in the form of thin discs of a resilient material inserted and fixed by means of an adhesive in openings cut into the casing wall. The film bag 5 is operable from externally by pressing upon the diaphragms 6 for the purpose of emitting cleaning agent via the conduits 2b and the nozzles 2c to the glasses.

The cleaning device further comprises as shown in FIG. 1 two retainers 2' for the wipers 1, an upper closing lid 3, a lower closing lid 7, two spare wipers 8 in the lower closing lid. B is a representation of eyeglasses.

When the lower closing lid 7 has been removed, the wipers 1, the limbs 2, the guide member 2a and the film bag 5 may be pulled rearwardly outwardly from the casing 4 in order to e.g. refill the film bag 5 or in order to exchange the wipers 1.

The invention may be embodied in other specific forms without departing from the spirit of essential characteristics thereof. The embodiment is therefore to be considered in all respects as illustrative and not restrictive.

What is claim is:

1. A cleaning device for eyeglasses comprising:
   (a) an elongated, rigid tubular wall means defining a casing, the opposite top and bottom ends thereof being open, the interior thereof being unobstructed and the interior cross-sectional configuration thereof being substantially uniform between positions adjacent the top and bottom ends thereof;
   (b) removable cover means for closing said opposite top and bottom ends;
   (c) a guide member substantially conforming to the interior cross-sectional configuration of said casing and longitudinally slidable therein between upper and lower positions in said casing;
   (d) a projection extending rearwardly from said guide member;
   (e) two spaced resilient limbs extending forwardly from said guide member, the free ends of said limbs each including retainer means, said limbs being adapted to extend around the edge of a spectacle lens;
   (f) a spong-like wiper member replaceably mounted on each of said retainer means at the free end of the respective resilient limb;
   (g) conduit means extending through said projection, through said guide member and through each of said limbs and communicating with each of said sponge-like wipers;
   (h) a collapsible bag detachably secured to said rearwardly extending projection for containing a liquid cleaning agent; and
   (i) a pair of apertures in opposite sides of said tubular wall means in alignment with said collapsible bag when said guide member is positioned at said upper position in said casing, and resilient diaphragm means covering each of said apertures;

(j) whereby when said guide member is at said lower position said limbs and wipers are contained within said casing, and when said guide member is in said upper position said limbs extend above said casing in an operative position, and in said latter position said resilient diaphragms may be pressed towards each other to compress opposite sides of said collapsible bag and cause said liquid cleaning agent to be fed through said conduit means to each of said sponge-like wipers when eyeglasses are being cleaned.

2. A cleaning device for eyeglasses according to claim 1 wherein said conduit means at the free end of each limb forms a nozzle in the region of the respective retainer means for projecting said liquid cleaning agent into said sponge-like wiper member.

3. A cleaning device for eyeglasses according to claim 1 wherein said removable cover means for closing said bottom end of said casing is adapted to serve as a receptacle for spare wiper members.

4. A cleaning device for eyeglasses according to claim 1 wherein said casing has an oval cross-sectional configuration.

5. A cleaning device for eyeglasses according to claim 1 wherein said guide member with said limbs, wiper members, projection and collapsible bag are adapted to be withdrawn rearwardly through said bottom end of said casing with said cover means removed therefrom.

6. A cleaning device for eyeglasses according to claim 1 wherein said sponge-like wiper members are discshaped.

7. A cleaning device for eyeglasses according to claim 1 wherein said resilient diaphragm means covering each of said apertures is formed integral with said tubular wall means of said casing.

8. A cleaning device for eyeglasses according to claim 1 wherein each of said resilient diaphragm means is a thin disc of resilient material inserted and fixed by means of adhesive in the respective aperture in said tubular wall means.

* * * * *